United States Patent [19]
DiPeri

[11] 3,964,268
[45] June 22, 1976

[54] ENERGY CONSERVATION HOUSING

[76] Inventor: Leonard J. DiPeri, 18325 Lahey St., Northridge, Calif. 91324

[22] Filed: Oct. 3, 1974

[21] Appl. No.: 511,743

[52] U.S. Cl. .................................. 62/121; 62/304; 62/314; 62/259; 62/263
[51] Int. Cl.² ...................... F28C 1/00; F28D 5/00
[58] Field of Search ............ 62/304, 309, 310, 314, 62/121, 171, 259, 263

[56] References Cited
UNITED STATES PATENTS

| 70,909 | 11/1867 | Somes | 62/309 |
|---|---|---|---|
| 1,375,417 | 4/1921 | Richardson | 62/314 |
| 1,904,686 | 4/1933 | Humphreys | 62/309 |
| 2,069,359 | 2/1937 | Dudley | 62/309 |
| 2,087,147 | 7/1937 | Hayes | 62/314 |
| 2,552,819 | 5/1951 | Schwarzmayr | 62/310 |
| 2,637,181 | 5/1953 | Schramm | 62/259 |
| 2,767,961 | 10/1956 | Frankland | 62/259 |
| 2,889,763 | 6/1959 | Pine | 62/314 |
| 3,214,936 | 11/1965 | DiPeri | 62/314 |
| 3,718,008 | 2/1973 | Zusmanovich | 62/314 |

*Primary Examiner*—William J. Wye

[57] ABSTRACT

The conditioning of building structures and the like by "exterior surface cooling" which takes advantage of heat flow from hot to cold areas for minimizing the energy required to condition the building interior. The exterior surface of the building is subjected to the flow of air which eliminates penetrating heat at the surface of the building structure, particular advantage being derived from the useful employment of otherwise waste evaporative air discharge from dry-air evaporative cooling, utilized with this invention both for sensible conditioning of the building interior and for surface cooling of the building exterior.

17 Claims, 11 Drawing Figures

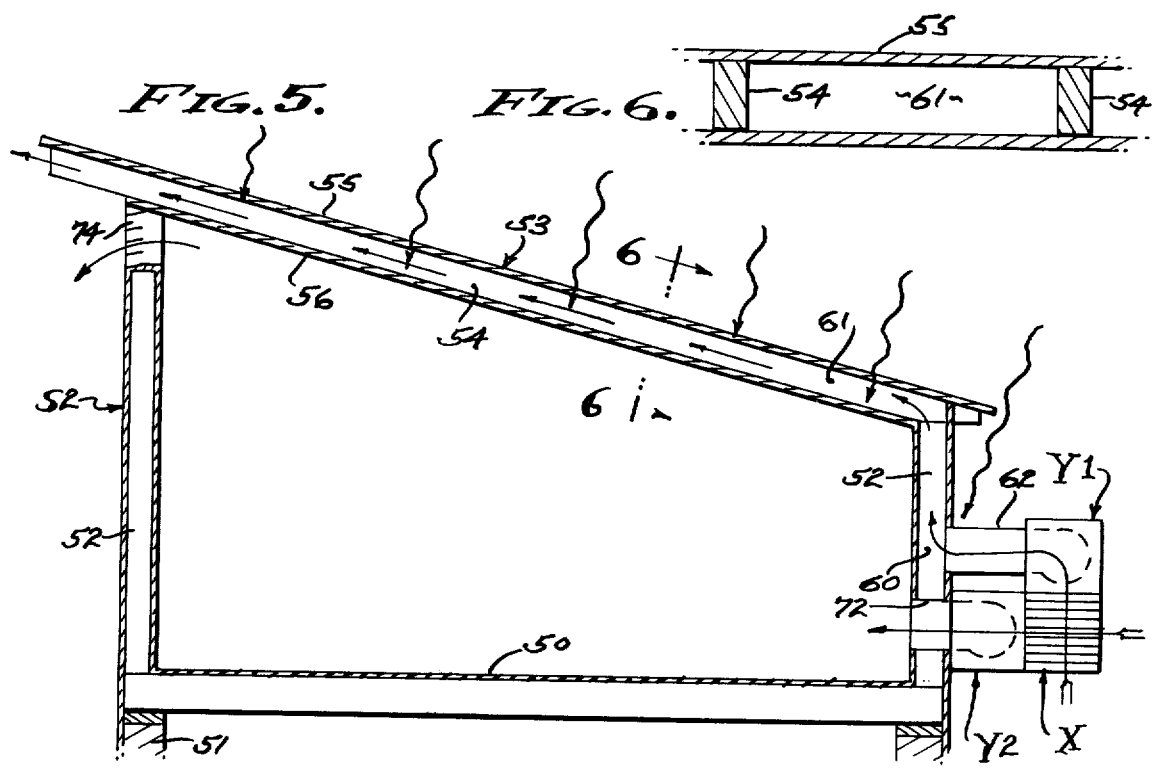
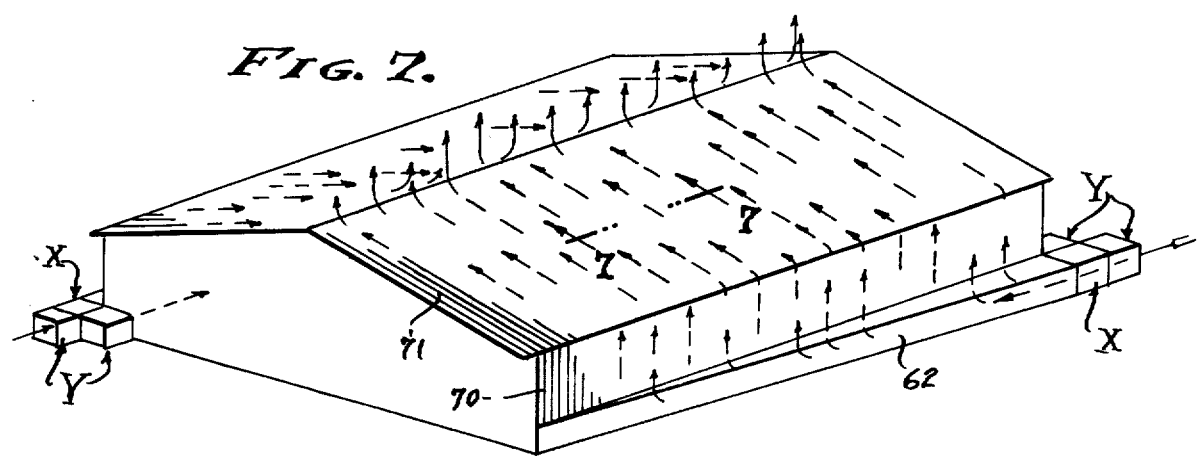
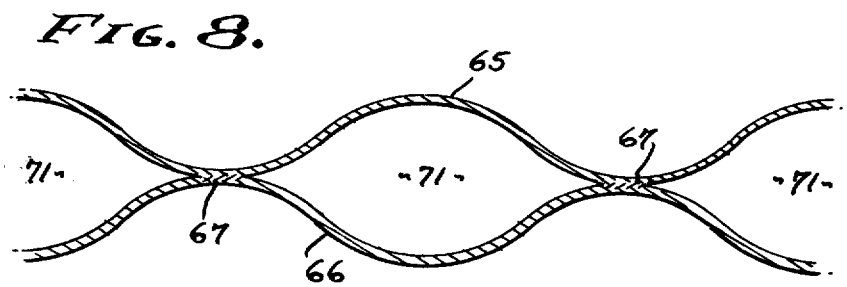

ENERGY CONSERVATION HOUSING

BACKGROUND

In the construction of buildings and the like such as trailers and motor homes and commercial structures as well, air conditioning is ordinarily excessively energy consuming commensurate with the inability of such structures to reject heat. It is solar heat which is of particular concern, that penetrates the structural surfaces and accumulates within the building interior, particularly closed buildings. Mechanical refrigeration and its sensible cooling process involves an energy change by lowering the air temperature without changing humidity; the net result being a subtraction of energy from the air processed, and at a commensurate cost rate according to the work performed. The evaporative cooling process involves no energy change, in that the decrease of energy in the treated air as a result of temperature decrease therein is regained in the form of humidity, and operates at a commensurately lesser cost rate according to the work performed. However, dry-air evaporative cooling advantageously employs two columns of air, using the evaporation of water as the means of absorbing heat while maintaining separation between the columns of air, so that one column remains evaporatively cooled and the other sensible cooled. Since the cost of evaporative cooling is far less than that of mechanical refrigeration, it is advantageous to employ dry-air evaporative cooling and its costs savings as a means for lowering air temperature in the building structures as hereinafter described.

The concept of this energy conservation housing involves the advantageous heat flow from hot to cold areas utilized to minimize the energy required to cool or heat a contained environment. By covering the exterior surface of a building with a moving layer of air, means is provided controlling heat coming to or through the surface. In order to remove heat, cooled air is moved so as to eliminate heat as it comes to the surface of the structure. In order to apply heat, tempered air can be moved to add heat to the surface of the structure. Thus, efficient interior temperature conditioning of the structure is attained.

The severe heat that is collected inside a home or recreational vehicle when kept closed during the day is eliminated by the cooling process hereinafter disclosed, since it rejects heat as it approaches or penetrates the exterior surface and thereby controls the internal temperature of the structure which would otherwise act as a heat sink continually absorbing solar heat eliminated only when the sun goes down. Furthermore, structures that have been insulated against heat are then hindered in reflecting heat, since the insulation then slows any cooling process and an air conditioner must overwork so as to maintain a comfortable internal temperature. By preventing heat from getting into the structure or through the usual insulation, by rejecting the heat at the surface as it is accomplished by the present invention, the energy required to cool or to heat the conditioned space is minimized and energy is conserved, this being the primary object of the present invention.

DRAWINGS

The various objects and features of this invention will be fully understood from the following detailed description of the typical preferred form and application thereof, through which description reference is made to the accompanying drawings, in which:

FIG. 5 is a sectional view through a building structure illustrating a second embodiment of the energy conservation housing.

FIG. 6 is an enlarged sectional view taken as indicated by line 6—6 on FIG. 5.

FIG. 7 is a persepctive view of a building structure illustrating a third embodiment of the energy conservation housing.

FIG. 8 is an enlarged sectional view taken as indicated by line 7—7 on FIG. 6.

Figure 9:
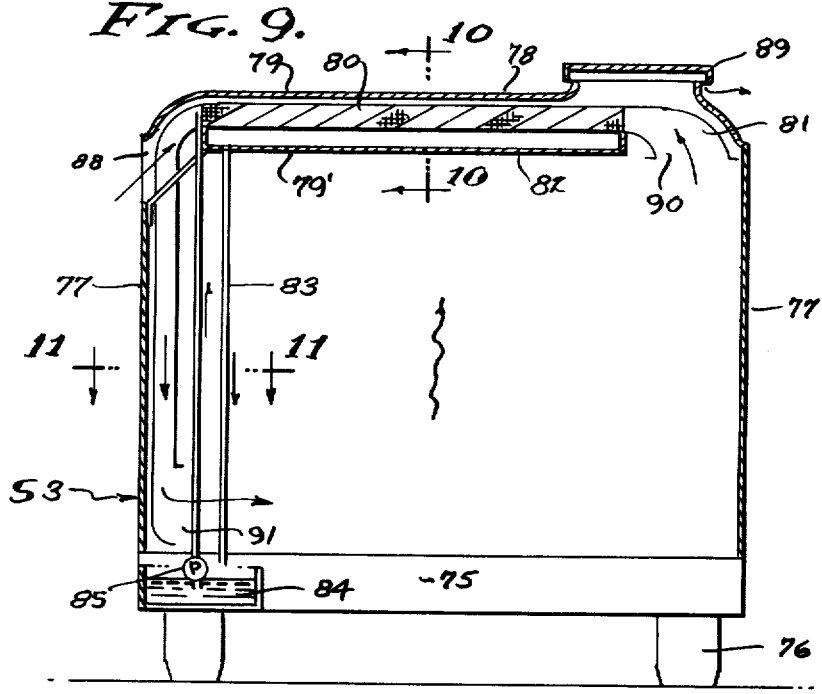
Figure 10:
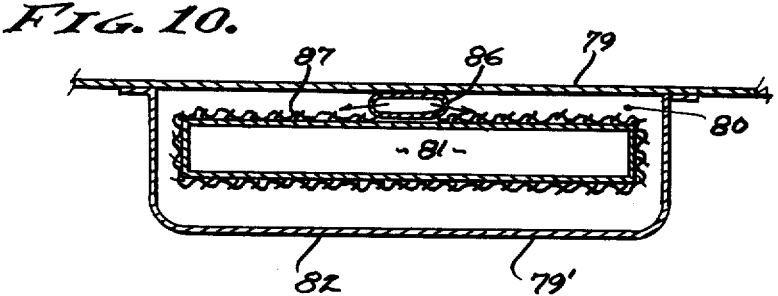
Figure 11:
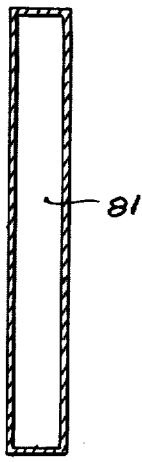

FIG. 9 is a sectional view through a vehicle structure illustrating a third embodiment of the energy conservation housing; and FIGS. 10 and 11 are enlarged detailed sectional views taken as indicated by lines 10—10 and 11—11 on FIG. 9.

PREFERRED EMBODIMENT

The phenomenon of "evaporative" cooling is a well known effect, in which process decrease in energy as a result of air temperature decrease is regained in the form of moisture; the net result being no change in energy. However, in a "sensible" cooling process there is a change in energy (enthalpy) by not admitting moisture; the net result being a subtraction of energy from the air. The obvious disadvantage of ordinary evaporative cooling is in the addition of moisture to the useful air, whereas the advantage of sensible cooling is that there is no change in absolute humidity during the process of cooling useful air. Reference is made to mechanical refrigeration means normally employed in sensible cooling processes, and all of which is to be compared with the dryair evaporative cooling which is the subject of U.S. Pat. No. 3,214,936 where there is a separation of air into refrigerated air subject to evaporation of water and useful air in which there is no humidity change.

In accordance with the present invention it is the dry-air evaporative principle that is employed, but with improvements relating to the further use of the evaporatively cooled air that is advantageously employed in the absorption of heat that would otherwise penetrate the housing structure exterior surface. Efficiency and economy is realized by moving evaporatively cooled air over the area of the building structure that is exposed to the sun and thereby subject to the penetration of solar heat. With the present invention, this penetration of heat is taken up by the moving evaporatively cooled air and carried off and/or eliminated thereby. It is contemplated that an evaporative cooler can be used for this one specific function of "film cooling" or "channel cooling" of a building exterior; however in its preferred form the evaporatively cooled by-product air of dry-air evaporative cooling is used for said specific function of "exterior surface cooling", while sensible cooled primary product air is used more effectively since it need not absorb the heat already eliminated by said "exterior surface cooling".

Each of the building structures illustrated in this disclosure is characterized by "exterior surface cooling"; which is conducted generally in one of two ways, either by "film cooling" or by "channel cooling". In either case it is the voluminous discharge of air which is deployed so as to move over and away from the exterior surface structure of the building, and thereby absorb the radiant heat approaching and/or penetrating said structure. The otherwise waste evaporatively cooled air of increased humidity is gainfully employed for this purpose and carries away and/or eliminates radiant heat by absorption before it penetrates the inner surface of the building structure. In other words, the idea of means involves the continuous elimination of radiant heat by absorption in a moving column of otherwise waste air that is discharged over or through the exterior surface of the building structure, whereby heat radiation through the inner surface of the building structure is reduced and/or virtually eliminated.

Figures 2, 3:
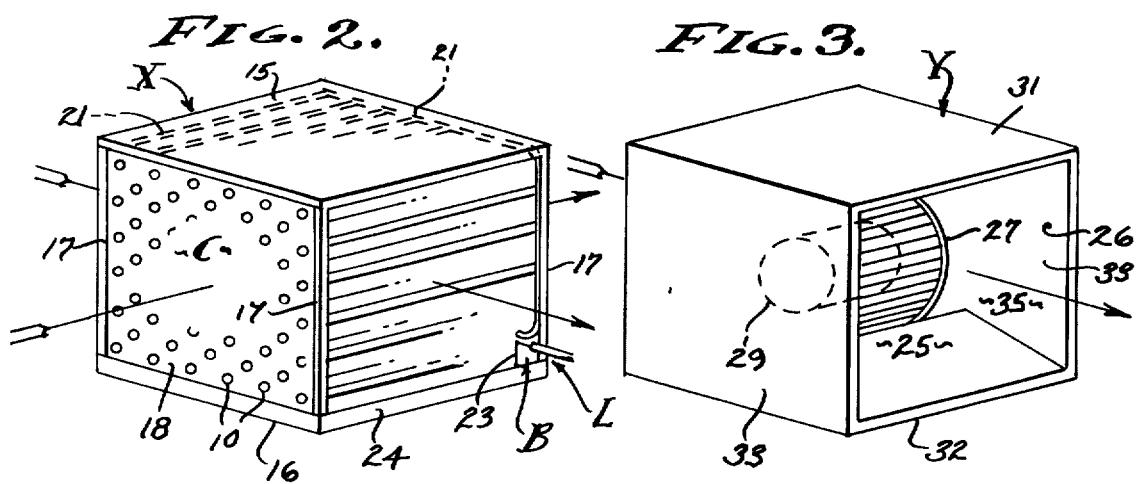
FIG. 2 is a perspective view of the evaporative module shown in FIG. 1.
FIG. 3 is a perspective view of the blower module shown in FIG. 1.
Figure 4:
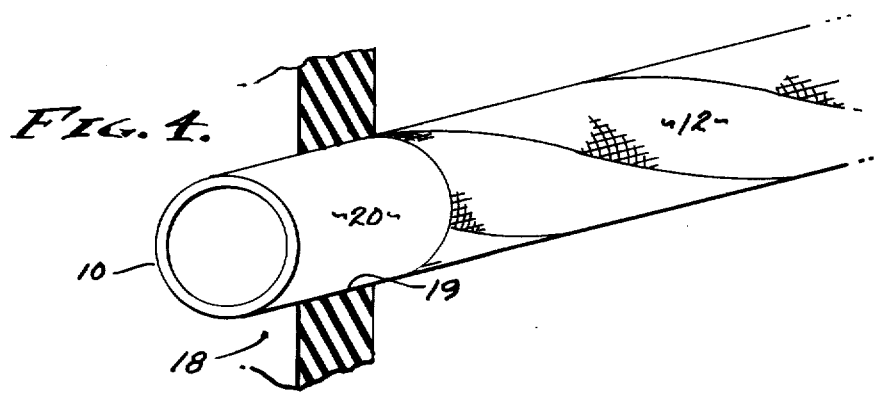
FIG. 4 is a persepctive view of one of the tubes which characterizes the evaporative module shown in FIG. 2.

Referring now to the dry-air evaporative cooler modules as they are illustrated individually in FIGS. 2, 3 and 7 of the drawings, there is a dry-air evaporator module X and a blower module Y, the two of which are employed as shown in the remaining figures of the drawings. The modules X and Y are adapted to be joined one to the other for flow of air therethrough, and the module X is adapted to deliver separated columns of air, one evaporatively cooled and the other sensible cooled. The modules X are three dimensional squares that transport air along two axes and coextensively of the cross sections thereof along each axis, the axes being right angularly related. Thus, the modules X and Y are adapted to be placed and/or stacked side by side, end to end, and top to bottom, dependent upon the augmentation required in order to achieve the air delivery and capacity desired.

The evaporator module X involves a dry-air evaporative cooler core C that fully occupies the volumetric space between top and bottom panels 15 and 16, and in practice there are corner legs 17 that join the panels together in spaced parallel planes for receiving and capturing the core C in working position therebetween. The dry-air evaporative cooler core C involves a multiplicity of the tubes 10 that extend between headers 18 in which they are supportably sealed. The headers 18 are identical channels perforated with openings 19 into which the opposite end portions 20 of the tubes 10 are pressed. The headers 18 are square panels of deformible material having top, bottom and opposite side edges compressed within the confines of the panels 15 and 16 and opposite side legs 17 when the core is positioned. Accordingly, the core headers are made of a resiliently compressible plastic or elastomeric material through which the tubes 10 frictionally project with a compression fit assured by the compressed confinement within the panels and legs. In practice, the on-center spacing of tubes 10, vertically as well as horizontally, is approximately two diameters; in which case there is substantial diagonal clearance between tubes for the exterior evaporative process when made damp by the application of water thereover. Characteristically therefore, the dry-air evaporator module X comprises closed top and bottom panels, and open sides and open ends through which separate columns of air are free to be transported along said right angularly related axes. The evaporative cooling involves the exterior of the tubes 10 by air flowing transversely over the wetted exterior of said tubes on one axis; and the sensible cooling process involves the interior of the tubes 10 by air flowing longitudinally through the interior of said tubes on another axis. As shown, wetness is held contiguous to the tube exterior by gauge 12 wrapped thereon.

Liquid distributing means B is provided to either wet the air or to wet the tubes and which can vary as circumstances require. As shown, the means B involves a liquid carrying conduit 21 disposed above each vertical arrangement of tubes 10. The conduits 21 are joined by a manifold 22 and they are perforated so as to discharge downwardly onto the vertical arrangements of tubes. As shown, there is a motor driven pump 23 that recirculates water from a pan or sump 24 formed of the bottom panel 16, and there is a water level controlled water supply means L to maintain water at the desired level in said pan. With this arrangement the exterior of the evaporative tubes 10 are kept constantly wetted.

The blower module Y involves an air pump means of any suitable type and preferably a centrifugal fan comprising a blower scroll 25 with opposite end openings 26 between which a barrel type blower wheel 271 is disposed on a transverse horizontal shaft about which the rotor of a drive motor 29 driveably revolves said wheel. It is to be understood that various blower and drive arrangements can be employed, including axial flow fans, and any of which will transport air longitudinally through the blower module Y which forms an elongate tunnel having top and bottom panels 31 and 32 and opposite side panels 33 also. In practice, when employing a centrifugal blower having a scroll 25, the intake of the module is entirely open into the interior chamber thereof, while the air delivered by the blower module Y is blown from the entire cross sectional area thereof defined by the panels 31, 32 and 33.

The evaporator module X is by itself ineffective to deliver useful air and requires air transport means for relative transverse and longitudinal air flow therethrough. The advantage of the modular construction is for adaption to specifications relating to interior conditioning and exterior surface cooling requirements, all of which is readily complied with by employing the various combinations of modules X and Y, as hereinafter described. In any case, separate columns of evaporative cooled air and sensible cooled conditioning air are transported under low pressures through the modules X on right angularly related axes; evaporatively cooled air transversely over the exterior of tubes 10, and sensible cooled air longitudinally within the interior of said tubes. In each instance the blower modules Y are to be used in transporting the air as clearly shown throughout the drawings.

Figure 1:
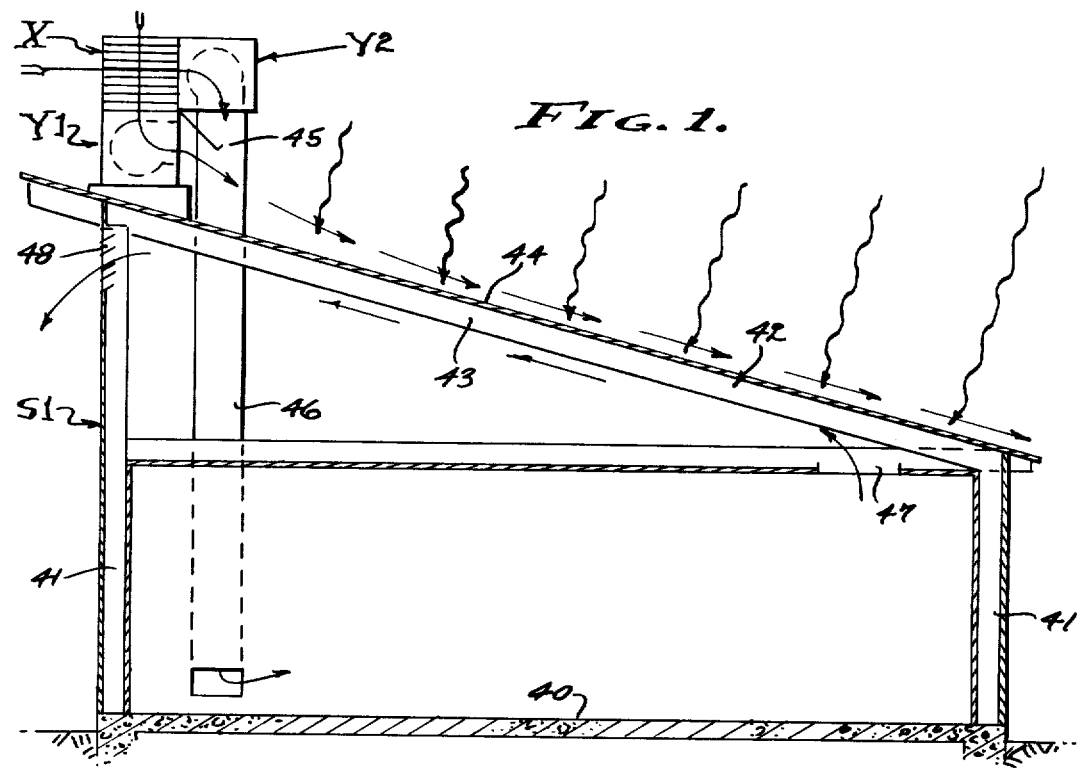
FIG. 1 is a sectional view through a buidling structure illustrating a first embodiment of the energy conservation housing.

Referring now to the "exterior surface cooling" as it is illustrated in a first form shown in FIG. 1 of the drawings, "film cooling" is employed for the removal of heat from the building exterior by means of the deployment of evaporatively cooled air discharged from a dry-air evaporative cooler which simultaneously discharges sensible cooled air into the building in order to condition its interior. The building S1 can vary widely in construction, and involves for example a slab 40 from which walls 41 rise to support a roof 42. In "film cooling" the exterior surface is directly involved, whether it be the roof or upstanding walls, and regardless of the exterior surfacing such as plastering or roofing. As shown in FIG. 1, a flat roof is involved. supported by rafters 43 upon which there is sheathing 44 covered by tarred paper (felt) surfacing commonly referred to as the "roofing". It is this roofing and underlying sheathing that is normally penetrated by solar heat which then radiates inwardly to warm the building interior.

The evaporator module X is installed with a blower module Y1 so as to deploy a layer of moving air over the roof 42, and in practice over substantially the entire roof area. As shown, the blower module Y1 draws air transversly through the module X for evaporative cooling thereby, and discharges the humidified air horizontally across the roof. A baffle 45 directs or nozzles the discharged air downwardly so that it fans out into a wide carpet or evaporative film. It is the close proximity of this film of moving air to the roof surface which enables it to absorb the radiant heat directly and reflectively; and to be reduced in humidity by the application of concentrated and/or accumulated heat at the roof surface or immediate thereto with a commensurate evaporative-drying of the air and a consequent cooling effect. The film of evaporatively cooled and dehumidifying air is then exhausted to the surrounding atmosphere over the edge of the roof remote from the discharge of the blower nozzle or baffle 45, or from whatever ducting might be involved therewith in the air conditioner installation.

The evaporative module X is installed with a blower module Y2 to deliver a column of sensible cooled air into the interior of the building. As shown, the blower module Y2 draws air longitudinally through the module X for sensible cooling thereby and discharges the sensible cooled air into the interior to be conditioned thereby. Ducting 46 distributes the sensible conditioning air into the building interior, to be circulated and recirculated and exhausted in the usual manner. An exhaust vent 48 is shown discharging conditioned air through the attic space from a ceiling vent 47.

Referring now the "exterior surface cooling" as it is illustrated in a second form shown in FIG. 5 of the drawings, "channel cooling" is employed for the removal of heat from within the interior structure of the building by means of the deployment of evaporatively cooled air discharged therethrough from a dry-air evaporative cooler which simultaneously discharges sensible cooled air into the building in order to condition its interior. The building S2 can vary widely in construction, and involves for example a raised floor 50 carried upon a foundation 51 and from which walls 52 rise to support a roof 53. In "channel cooling" both the exterior and the interior surfaces are directly involved, whether it be the roof or supporting walls (and in some instances the floor), and regardless of the exterior and/or interior surfacings used such as plastering or roofing and/or paneling. As shown in FIG. 5, a pitched roof is involved, supported by rafters 54 over which there is exterior sheathing 55 covered by roofing such as shingles, and inside or under which there is interior sheathing 56 or plaster or paneling. It is this double walled structure with an air space between that is normally penetrated by solar heat which then warms the building interior.

In accordance with this second form of "exterior surface coding" there are adjacently related ducts 60 and 61 respectively, extending up the walls 52 and/or across the roof 53, said ducts being supplied with evaporatively cooled air at one margin of the wall or roof, and open to exhaust air at the other margin of the wall or roof. Characteristically, there is a multiplicity of adjacently related ducts 60 and 61 coextensively covering the wall and roof areas respectively, there being a supply manifold 62 feeding the ducts at the said one margin of the wall or roof. In carrying out this invention, and as shown in FIG. 5, the ducts 60 of the walls 52 continue into the ducts 61 of the roof. The said ducts being established between the structural members, namely the wall studs and roof rafters as the case may be (see FIG. 6). As shown in FIGS. 7 and 8 the exterior surface panels are manifolded with a multiplicity of ducts 70-71 established by opposed formed members such as corrugated sheating 65-66 secured one to the other along the ridges 67 of the opposing corrugations thereof; condusive to the erection of commercial buildings and providing a building exterior for the purposes of this invention independent of other interior structures involving partition walls and compartments.

The evaporator module X is installed with a blower Y1 to deploy a column of moving air through the manifolded walls 52 and/or roof 53, and in practice through substantially the entire area thereof in each instance. As shown, the blower module Y1 draws air transversly through the module X for evaporative cooling thereby and discharges the humidified air into the manifolded walls and/or roof elements. A manifold-distributor 62 deploys the discharge air into the multiplicity of ducts 60-61, the manifold-distributor 62 being a tube receiving cooled-humidified air from module X and opening laterally into each individual duct 60-61. In practice, the distributor 70 is tapered between the first to last duct to be supplied, thereby equalizing the flow throughout the multiplicity of ducts. It is the confinement of this column of moving air within the walls and/or roof surface structures which enables it to absorb the radiant heat directly and conductively; and to be reduced in humidity by the application of concentrated and/or accumulated heat as a result of confinement within said surface structure with a commensurate evaporation-drying of the air and a consequent cooling effect. The column of evaporatively cooled and dehumidified air is then exhausted to the surrounding atmosphere from the edge of the wall or roof remote from the manifold-distributor tube 62, or from whatever ducting might be involved therewith in the air conditioner installation.

The evaporator module X of FIG. 5 is installed with a blower module Y2 to deliver a column of sensible cooled air into the interior of the building. As shown, the blower module Y2 draws air longitudinally through the module X for sensible cooling thereby and discharges the sensible cooled air into the compartmented area to be conditioned thereby. Ducting 72 distributes the sensible conditioning air into the building compartment or compartments, to be circulated and recirculated as desired, and to be subsequently exhausted partially or completely from the building structure. In accordance with this invention, the used conditioned air is then exhausted to the outside atmosphere through an exhaust vent 74 opening from said attic or like space.

Referring now to the "exterior surface cooling", as it is illustrated in the third form of invention shown in FIGS. 9–11 of the drawings, "convection cooling" is employed for the removal of heat from a vehicle exterior (a building) by means of the deployment of evaporatively cooled air flowing over a conditioning duct through which sensible cooled air is circulated through the vehicle interior. The vehicle S3 can vary widely in construction, and involves for example a mobile floor 75 carried upon a wheeled chassis 76 and from which walls 77 rise to support a roof 78. "Channel cooling" is effected by the structural combination shown wherein both the exterior 79 and interior 79' surfaces of the structure form an evaporative duct 80 through which air rises or circulates by means of convection (natural or artificial gravity). Interior conditioning is then achieved by means of a sensible duct 81 through which air descends, also by means of convection (natural or artificial gravity). This embodiment is characterized by the contra flow of evaporative and sensible cooled air columns through the ducts 80 and 81 respectively.

The evaporative duct 80 is horizontally disposed and extends transversely across the roof 78 with the sensible duct 81 disposed co-axially therethrough and leaving an annulus for the circulation of evaporative air. The lower side of duct 80 provides a catch basin 82 for water, there being a drain tube 83 to a sump or reservoir 84 from which water is supplied by a pump 85 to a soaker hose 86 that overlies the duct 81. Duct 81 is surfaced with gauze 87 or the like so as to retain moisture and remain wetted. As shown, the roof is vented at 88 and 89 for intake and exhaust of evaporatively cooled air, while duct 81 is vented at the ceiling and floor levels 90 and 91 for inlet and exhaust respectively. As is clearly indicated, the cooled air drops by means of gravity and discharges into the vehicle interior where it absorbs heat and then rises to be recycled through the sensible duct 81 with its exterior cooled by evaporation within duct 80. Thus, air conditioning circulation is achieved by maintaining a wetted surface upon duct 81.

From the foregoing it will be seen that I have provided an energy conserving concept that removes radiant heat by the thorough utilization of evaporation, absorption, and conduction principles, all as herein above described and related to structural adaptations that are easily applied to buildings and the like. In carrying out this invention, the heat that is developed at or within the surface structures of buildings and the like, as a result of solar heating thereof, is immediately removed and vented away; partially or entirely dependent upon the desired capability and by design involved with each installation.

Having described only typical preferred forms and applications of my invention, I do not wish to be limited or restricted to the specific details herein set forth, but wish to reserve to myself any modifications or variations that may appear to those skilled in the art.

I claim:

1. A process of rejecting heat at the exterior surface of a building structure, comprising the moving of a blanket of evaporatively cooled humidified air coextensively contiguous to and across the exterior surface thereof subject to the penetration of radiant heat, whereby heat radiating toward the exterior surface is absorbed by evaporative drying of the humidified air and carried off thereby.

2. The process of rejecting heat at the exterior surface of a building structure as set forth in claim 1 and wherein the evaporatively cooled air is moved in parallel columns through channels in the exterior surface, whereby the evaporative drying is achieved by confinement.

3. A process of rejecting heat at the exterior of and to air condition a building structure, comprising moving two columns of air through a dry-air evaporative cooler, a first column of air being evaporatively cooled and tranferring heat from a second column of air which is thereby sensible cooled, discharging the first column of evaporatively cooled humidified air coextensively as a blanket contiguous to and across the exterior surface of the building structure subject to the penetration of radiant heat to absorb the same by evaporative drying of the humidified air, and moving the second column of sensible cooled air into the building interior to condition the same.

4. The process of rejecting radiant heat and of air conditioning a building structure as set forth in claim 3 and wherein the evaporatively cooled air is moved in parallel columns through channels in the exterior surface, whereby the evaporative drying is achieved by confinment.

5. In combination with a building structure having an exterior surface subject to the penetration of radiant heat and a closed interior to be air conditioned, a dry-air evaporative cooler with means evaporatively humidifying and cooling a first column of air while transferring heat from and thereby sensible cooling a second column of air, blower means discharging the first column of evaporatively cooled air coextensively contiguous to and across the exterior surface to absorb heat by evaporative drying of the humidified air to carry off heat from said exterior surface, and blower means moving the second column of sensible cooled air into the building interior to condition the same.

6. The dry-air evaporative cooler, blower and conditioned building structure combination as set forth in claim 5, and wherein baffle means directs the evaporatively cooled air as a blanket over the exterior surface.

7. The dry-air evaporative cooler, blower and conditioned building structure combination as set forth in claim 5, and wherein the exterior surface is a roof which is subject to the penetration of radiant heat.

8. The dry-air evaporative cooler, blower and conditioned building structure combination as set forth in claim 5, and wherein the exterior surface is an upstanding wall which is subject to the penetration of radiant heat.

9. The dry-air evaporative cooler, blower and conditioned building structure combination as set forth in claim 5, wherein the exterior surface is a roof which is subject to the penetration of radiant heat, and wherein baffle means directs the evaporatively cooled air as a blanket over the exterior surface of the roof.

10. The dry-air evaporative cooler, blower and conditioned building structure combination as set forth in claim 5, wherein the exterior surface is an upstanding wall which is subject to the penetration of radiant heat, and wherein baffle means directs the evaporatively cooled air as a blanket over the exterior surface of the wall.

11. In combination with a building having a channeled exterior surface structure subject to the penetration of radiant heat and a closed interior to be air conditioned, a dry-air evaporative cooler with means evaporatively humidifying and cooling a first column of air while transferring heat from and thereby sensible cooling a second column of air, blower means moving the first column of evaporatively cooled air for discharge through the channeled exterior surface structure to absorb heat by evaporative drying of the humidified air to carry off heat from said channeled exterior surface, and blower means moving the second column of sensible cooled air into the building interior to condition the same.

12. The dry-air evaporative cooler, blower and air conditioned building and surface structure combination as set forth in claim 11, and wherein manifold means directs the evaporatively cooled air as a blanket through said channeled exterior surface.

13. The dry-air evaporative cooler, blower and air conditioned building and surface structure combination as set forth in claim 11, and wherein the exterior surface structure is a roof which is subject to the penetration of radiant heat.

14. The dry-air evaporative cooler, blower and air conditioned building and surface structure combination as set forth in claim 11, and wherein the exterior surface structure is an upstanding wall which is subject to the penetration of radiant heat.

15. The dry-air evaporative cooler, blower and air conditioned building and surface structure combination as set forth in claim 11, wherein the exterior surface structure is a roof which is subject to the penetration of radiant heat, and wherein manifold means distributes the evaporatively cooled air through the channels of the exterior surface structure of the roof.

16. The dry-air evaporative cooler, blower and air conditioned building and surface structure combination as set forth in claim 11, wherein the exterior surface structure is an upstanding wall which is subject to the penetration of radiant heat, and wherein manifold means distributes the evaporatively cooled air through the channels of the exterior surface structure of the wall.

17. In combination with a building having an exterior surface structure subject to the penetration of radiant heat and a closed interior to be air conditioned, a dry-air evaporative cooler with duct means evaporatively cooling a first column of air while transfering heat from and thereby sensible cooling a second column of air, said duct means having means for exterior air to be evaporatively cooled and having intake and exhaust openings for interior air to be sensible cooled, the latter exhaust opening being at a lower level than the intake opening for convection flow of cooled air that descends by means of gravity.

* * * * *